(12) United States Patent
Sen Sarma et al.

(10) Patent No.: US 10,606,664 B2
(45) Date of Patent: Mar. 31, 2020

(54) HETEROGENEOUS AUTO-SCALING BIG-DATA CLUSTERS IN THE CLOUD

(71) Applicant: QUBOLE INC., Santa Clara, CA (US)

(72) Inventors: Joydeep Sen Sarma, Bangalore (IN); Mayank Ahuja, Cupertino, CA (US); Ajaya Agrawal, Bangalore (IN); Prakhar Jain, Bangalore (IN); Hariharan Iyer, Bangalore (IN)

(73) Assignee: Qubole Inc., Santa Clara, CA (US)

( * ) Notice: Subject to any disclaimer, the term of this patent is extended or adjusted under 35 U.S.C. 154(b) by 101 days.

(21) Appl. No.: 15/698,611

(22) Filed: Sep. 7, 2017

(65) Prior Publication Data

US 2018/0067783 A1 Mar. 8, 2018

Related U.S. Application Data

(60) Provisional application No. 62/384,277, filed on Sep. 7, 2016.

(51) Int. Cl.
*G06F 9/46* (2006.01)
*G06F 9/50* (2006.01)

(52) U.S. Cl.
CPC .................. *G06F 9/5083* (2013.01)

(58) Field of Classification Search
None
See application file for complete search history.

*Primary Examiner* — Gregory A Kessler
(74) *Attorney, Agent, or Firm* — Landmark Intellectual Property Law, PLLC

(57) ABSTRACT

The present invention is generally directed to systems and methods of provisioning and using heterogeneous clusters in a cloud-based big data system, the heterogeneous clusters made up of primary instance types and different types of instances, the method including: determining if there are composition requirements of any heterogeneous cluster, the composition requirements defining instance types permitted for use; determining if any of the permitted different types of instances are required or advantageous for use; determining an amount of different types of instances to utilize, this determination based at least in part on an instance weight; provisioning the heterogeneous cluster comprising both primary instances and permitted different types of instances.

6 Claims, 3 Drawing Sheets

Exemplary Protocol for Allocating and Prioritizing Instances

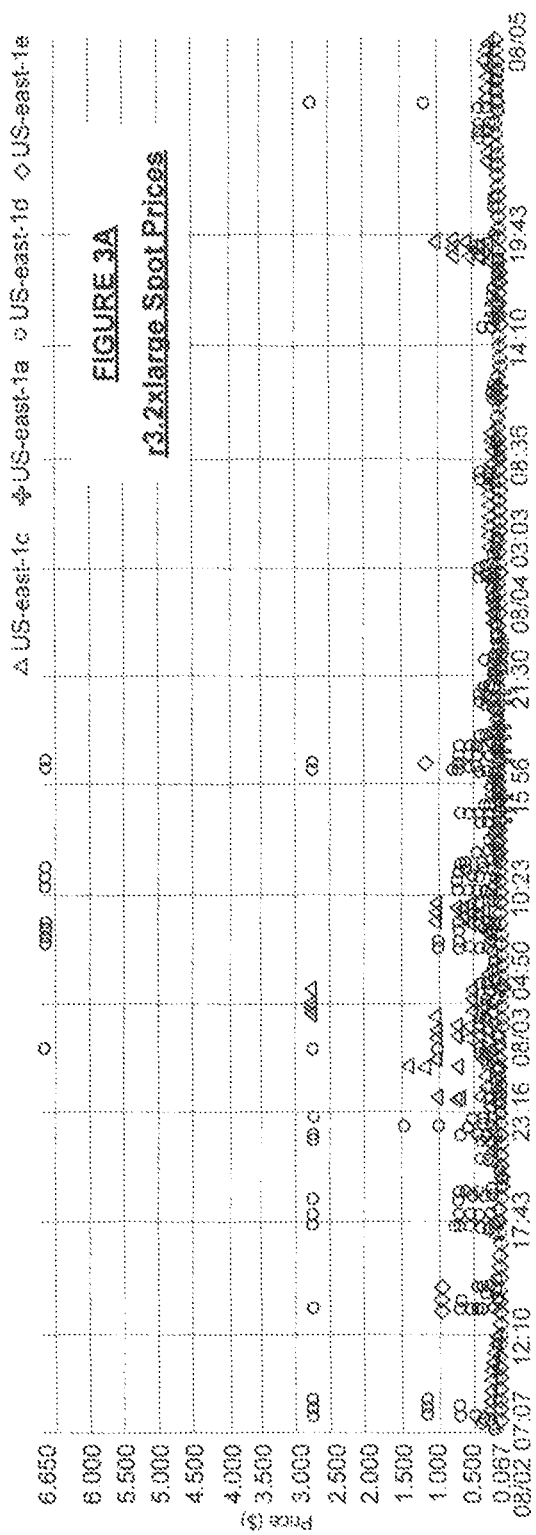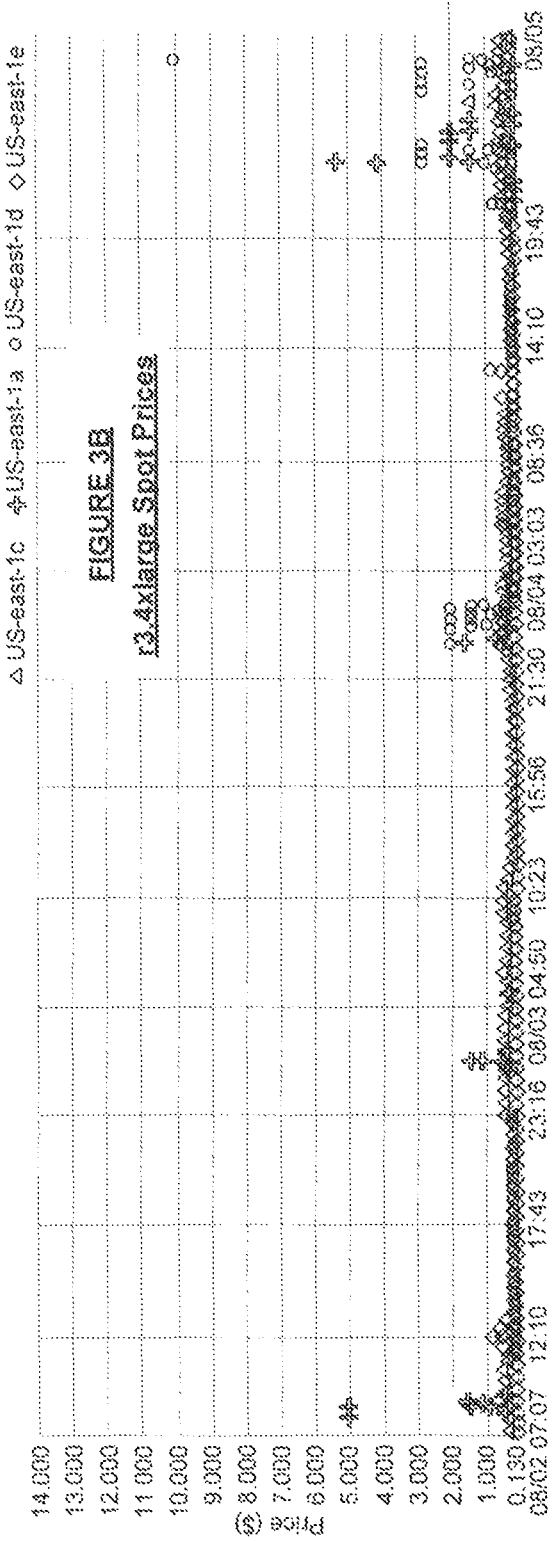

HETEROGENEOUS AUTO-SCALING BIG-DATA CLUSTERS IN THE CLOUD

RELATED APPLICATIONS

The present application claims priority to U.S. Provisional Patent Application No. 62/384,277, entitled "Heterogeneous Auto-Scaling Big-Data Clusters in the Cloud," filed on Sep. 7, 2016, and incorporated by reference herein in its entirety.

BACKGROUND

Big data engines like Hadoop, Spark and Presto may generally work well when the machines of which they are composed are similar in processing power. This may allow a central resource manager to optimally or advantageously place workers on the nodes, as well as may provide users with an ability to tune jobs according to the configuration of a single machine. This model may generally work well when a user has complete control over the resources he or she can purchase and use. However, this model may begin to be disadvantageous if the user is sharing resources with thousands of other users in the cloud. For example, a user may often see that the type of machine desired by the user is not available. This problem may be exacerbated when a user has multiple purchase options, such as in Amazon Web Services (AWS) or similar systems, where the user can purchase spot instances at a tenth of the normal price of a machine. In such a case, a user may want to utilize the cheapest comparable instance rather than a more expensive instance.

Accordingly, there is a need for solving problems associated with provisioning and using heterogeneous clusters composed of varying types of instances used in cloud based big data services.

SUMMARY OF THE INVENTION

Some aspects in accordance with some embodiments of the present invention may include a method for heterogeneously auto-scaling cloud-based big data clusters to use multiple instance types, comprising: determining provisioning requirements based on a primary instance type; assigning a weight of 1.0 to the primary instance type; identifying other approved instance types and determining an instance weight for each other approved instance type; determining if using any other instance types is advantageous in that it would result in reduced costs, faster processing, or other advantages; if using other instance types is advantageous, determining which other instance types to use, and determining the number of other instance types by using the instance weight to determine corresponding processing power.

Some aspects in accordance with some embodiments of the present invention may include a method of provisioning and using heterogeneous clusters in a cloud-based big data system, the heterogeneous clusters comprised of primary instance types and different types of instances, the method comprising: determining if there are composition requirements of any heterogeneous cluster, the composition requirements defining instance types permitted for use; determining if any of the permitted different types of instances are required or advantageous for use; determining an amount of different types of instances to utilize, this determination based at least in part on an instance weight; provisioning the heterogeneous cluster comprising both primary instances and permitted different types of instances.

Some aspects in accordance with some embodiments of the present invention may include a method for determining a normalized instance count for a heterogeneous cluster, the normalised instance count indicating the amount of computing power as represented by a number of primary instances, comprising: determining weight for each instance type used in the heterogeneous cluster; determining a normalized size for each instance type by multiplying the weight for each instance type by the number of instances for that type; adding the normalized sizes for each instance type to determine the normalized size for the heterogeneous cluster.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

A The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIGS. 3A-3B illustrates exemplary price fluctuations for an r3.2xlarge and r3.4xlarge instance, respectively, for a certain date, as used by some embodiments of the present invention.

Figure 1:
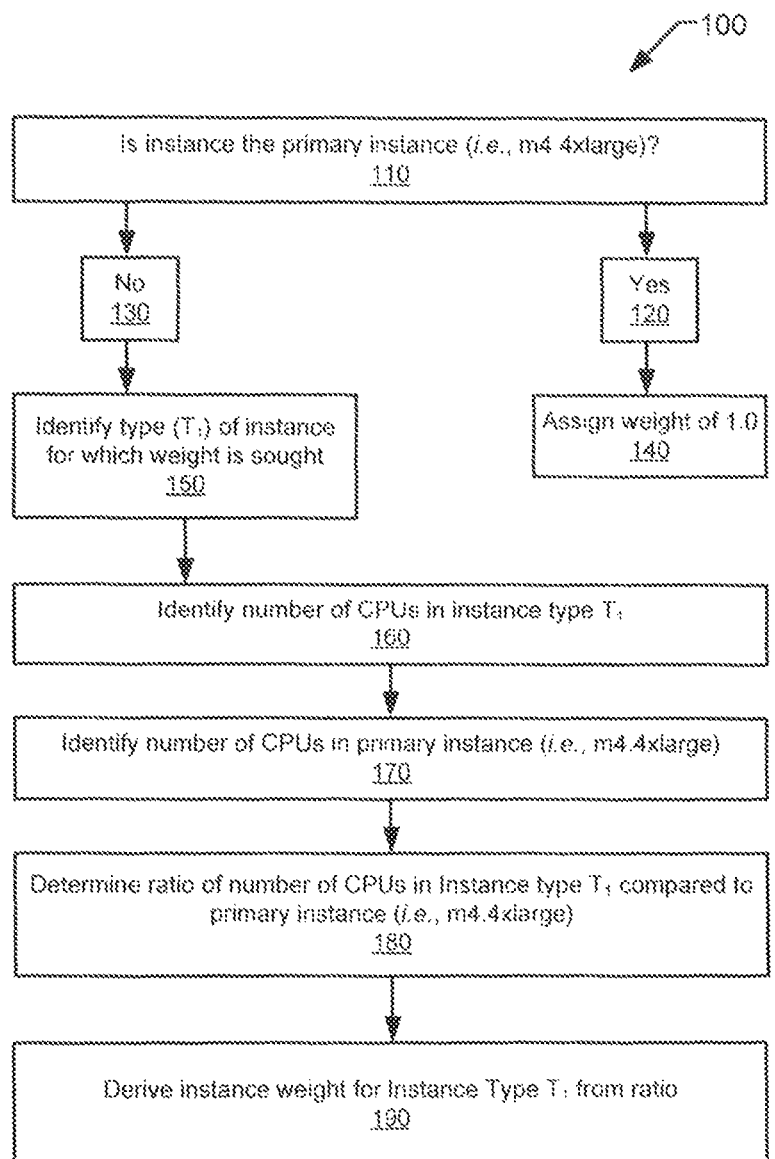
FIG. 1 illustrates an exemplary process flow, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In the present application, the following terms may be used. The listing below indicates a general understanding of how the inventors and applicant intends the use of such terms.

Instance Type: An instance type is used to denote a fixed configuration machine. For example in AWS cloud—m4.2xlarge is an instance type. An instance type is associated with a fixed amount of CPU, Memory, direct-attached Disk and Network resources.

Instance Family: A cloud may offer a set of instance types that are similar in their Memory/CPU, Memory/Disk and Memory/Network resources. For example in the AWS cloud—m4 is an instance family—and m4.large, m4.xlarge, m4.2xlarge etc. are instance types belonging to that family. All the m4 instance types have approximately 4 GB of memory per CPU.

Homogeneous Cluster: A homogeneous cluster is one where all the worker nodes are of identical instance types.

Heterogeneous Clusters: A heterogeneous cluster is one where the worker nodes are from two or more different types of instances. This can be further broken down into Weakly Diversified, which is a heterogeneous cluster with instances drawn from one instance family only; and Strongly Diversified, which is a heterogeneous cluster with instances drawn from two or more different instance families.

As noted above, in general the present invention details methods used to solve certain problems in building and running heterogeneous clusters. Such problems may be addressed by, for example, (i) specifying the composition requirements of a heterogeneous cluster; (ii) using specific algorithms to provision instances across varying instance types; and/or (iii) running workloads in reliable and optimal and/or advantageous manners across different instance types. Each of these approaches is discussed in turn below.

Specifying Cluster Composition. Any cluster in a cloud based big data service may be configured to use heterogeneous instance types. This configuration may be supplied independently on each cluster. For example, every cluster may have a primary instance type (for worker nodes). In addition, a configuration may provide a list of additional whitelisted instance types—that is, instance types approved by the user—that may span instance families. Additional whitelisted instance types may be associated with an instance weight (as discussed in greater detail below). A different set of instance weights can be supplied corresponding to different types of resources.

For example, a set of instance weights may be supplied by:

```
{
    "memory": [
        {"instance_type": "m3.2xlarge", "weight": 1},
        {"instance_type": "c3.xlarge", "weight": 0.7},
        {"instance_type": "c3.large", "weight": 0.35}
    ],
    "Disk": [
        {"instance_type": "m3.2xlarge", "weight": 1},
        {"instance_type": "c3.xlarge", "weight": 0.5},
        {"instance_type": "c3.large", "weight": 0.25},
    ],
}
```

In a homogeneous cluster, the size of the cluster may simply be the number of worker nodes, but this may not be true for a heterogeneous cluster. For example, the work capacity of an m3.4xlarge instance is notionally twice that of an m3.2xlarge instance, and four (4) times that of an m3.xlarge. While this may be self-evident when the instances belong to the same family, this simply analysis may not apply across different instance families. For example, how would one accurately determine how many c3.xlarge instances an m3.xlarge instance is worth? In accordance with some embodiments of the present invention, this decision may be optionally configurable by the user. For example, the administrator of the cluster may decide how many of one instance type fit in one instance of the other type. In the example above, the user has provided the following weights for his allowed instance types: (i) m3.2xlarge—1.0; (ii) c3.xlarge—0.7; and (iii) c3.large—0.35

This example indicates that, according to the user, a machine of c3.xlarge instance type is only worth 0.7 of an m3.2xlarge instance—and similarly that a c3.large is only worth 0.35 of an m3.2xlarge instance. Note that the instance weight of the primary instance type is always 1.0. Accordingly it can be quickly seen that in this particular example the m3.2xlarge instance is considered the primary instance type.

In accordance with some embodiments of the present invention, a cluster may be scaled up to provision different types of resources. Each resource type may have different set of instance weights. Using the example above, a c3.xlarge only has 80 GB of disk space as compared to a m3.2xlarge which has 160 GB of disk space. Therefore, it may be expressed as being equal to 0.5 of a m3.2xlarge. Accordingly, the instance weight for an instance type may be different for different resource types.

It may be useful in many situations to refer to the number of machines in a cluster. Similarly, it may be useful to determine a number of machines that may be desirable to add to a cluster. However—in a heterogeneous cluster, the cluster size (in terms of machines) may be misleading since it may contain machines of different types. The notion of a normalized instance count generally allows us to normalize instance count based on instance weights.

To continue with the above example, consider a cluster with a current composition of: (i) two (2) m3.2xlarge instances; (ii) four (4) c3.xlarge instances; and (iii) eight (8) c3.large instances. The normalized size of the cluster, based on the memory resource type, may be (2*1.0)+(4*0.7)+(8*0.35)=7.6. This normalized instance count may then be used by a cloud based big data service for: (i) specifying the minimum and maximum size of the clusters; (ii) computing the number of instances that should be added or removed dynamically by auto-scaling module; and/or (iii) showing the number of instances in use in different user-interfaces. Note that the normalized instance count represents the equivalent number of nodes of the primary instance type.

Orthogonal to the weights of the instances may be their order of preference. The user may provide the cloud based big data service with a specific order of instance types (for each resource type). Depending on availability, the cloud based big data service may then attempt to acquire instances in the specific order provided.

In accordance with some embodiments of the present invention, pre-defined templates of heterogeneous configurations that encapsulate standard instance types may be desirable. While manual control over instance weights allows a great degree of flexibility—it may also be burdensome to users. In many cases the instance weights may be apparent and such pre-defined templates may be used. For example, a general-purpose instance heterogeneous template for AWS in 2016 may include: (i) all m3 instance types and all m4instance types; (ii) Assigning an instance weight of 1.0 to m4.4xlarge (a standard M4machine type); and/or (iii) Deriving an instance weight for all other instance types based on the ratio of number of CPUs in that instance type compared to the m4.4xlarge instance.

This exemplary process of determining an instance weight is generally illustrated in FIG. 1. At 110, it is first determined if the instance in question is the primary instance, here m4.4xlarge. If Yes (at step 120), the instance weight is assigned as 1.0 at step 140. If not (at step 130), the type of instance $T_1$ for which the weight is sought is determined at 150. Then at 160 the number of CPUs in instance type $T_1$ may be identified, determined, or calculated. At 170 the number of CPUs in the primary instance type (for example here, m4.4xlarge) may be identified, determined, or calculated. A ratio between the number of CPUs in instance type $T_1$ and the number of CPUs in the primary instance may then be determined at 180. At 190, the instance weight for instance type $T_1$ is derived from the ratio (for example, if the ratio is 0.8, the instance weight for $T_1$ is 0.8).

Similarly, it is contemplated that instance weights may be automatically prefilled in many cases, for example based on simple metrics such as number of CPUs or a desired amount of memory.

Provisioning Protocols. Provisioning protocols may be invoked both during initial cluster startup (to allocate the minimum/core nodes in a cluster) and/or during upscaling and/or downscaling when responding to changing workload requirements in order to resize a cluster.

Figure 2:
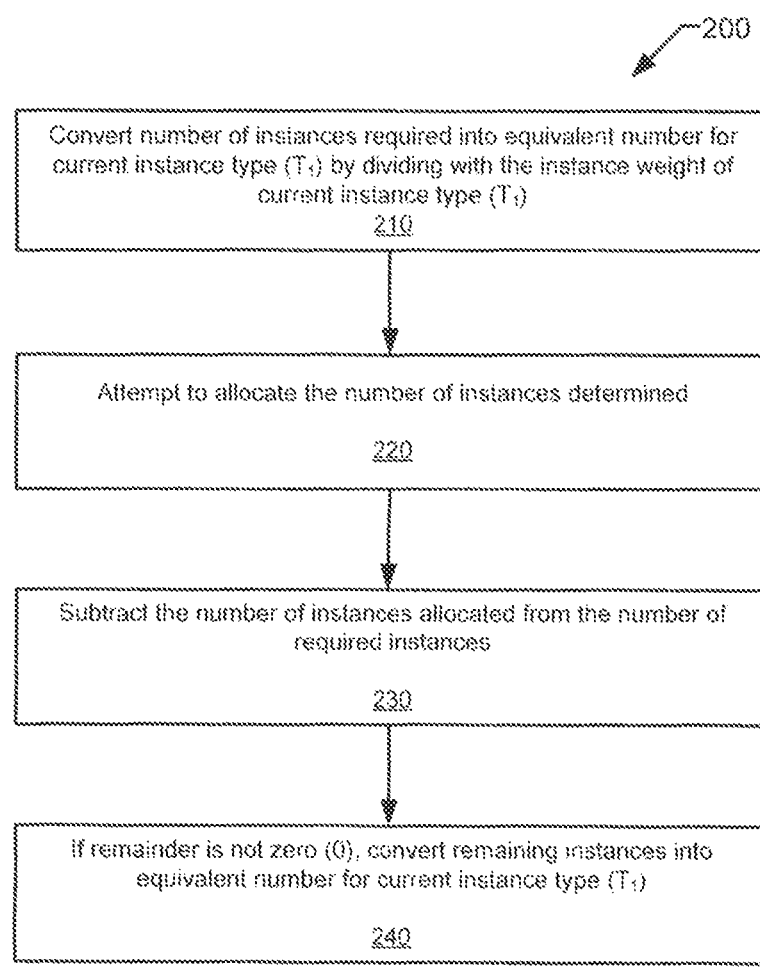
FIG. 2 illustrates an exemplary process flow, in accordance with some embodiments of the present invention.

In accordance with some embodiments of the present invention, the systems and methodologies described herein may be applied to circumstances involving fixed-price instances and priority based provisioning. For example, in an auto-scaling scenario, Hadoop may determine that an additional 10 instances is needed or desired. For brevity, let us consider the weights as in Example 1 above. A simple protocol for allocating these instances may be to allocate the instances based on the ordering (or priority) of the instances in the whitelist. As set forth in FIG. 2, this exemplary protocol may include, for each instance type in the heterogeneous configuration: (i) Convert the remaining number of instances required into the equivalent number for the current instance type (by dividing with the instance weight of the current instance type) at step 210; (ii) Trying to allocate the number of instances computed in above at step 220; and (iii) Subtract the number of instances allocated in from the required instances at step 230. If the remainder is non-zero, then at step 240, converting the remaining instances into the equivalent number for the current instance type, as discussed above.

Translating to a real-life example, systems and methods in accordance with the present invention may attempt to acquire ten (10) m3.2xlarge instances. However (in this example), because of lack of availability of this particular type, only four (4) m3.2xlarge instances were granted.

Accordingly, there is still a requirement of six (6) more m3.2xlarge instances. In accordance with some embodiments of the present invention, nine (9) c3.xlarge instances will be requested for provisioning. Note that nine (9) are needed since, according to the instance weight, (6/0.7)=8.57, or an integer value of nine (9).

If nine (9) c3.xlarge instances cannot be provided, then the process would continue, wherein the remainder would be filled with c3.large instances, calculating the required number based on its weight of 0.25 as above.

In accordance with some embodiments of the present invention, the systems and methodologies described herein may be applied to circumstances involving dynamic priced instances and cost optimized provisioning. Several clouds may offer the option to purchase an instance via a marketplace where the prices of instances are dynamic. For example, AWS offers what are termed "Spot Instances." The price of a spot instance may be extremely variable, since pricing is based on supply-and-demand. It is often observed that the price of one particular instance type may be quite high, while that of a comparable instance from a different family, or even a different instance from the same family, may be significantly lower.

For example, consider the spot price graphs of r3.2xlarge and r3.4xlarge instances as shown in FIGS. 3A-3B. As can be seen from FIGS. 3A and 3B, the price of an r3.2xlarge instance—which is the smaller and cheaper instance type—has frequently exceeded the spot price of its larger, more expensive counterpart over the period of the day. The r3.2xlarge instance has been as high as $6.65, while the r3.4xlarge instance has generally been under $2.00. In such a scenario, if the preferred instance type for the user was r3.2xlarge and the user requested n r3.2xlarge instances, it would have been cheaper to provision half the desired number (n/2) of r3.4xlarge instances instead.

In accordance with some embodiments of the present invention, systems and methods may be capable of optimally provisioning the least expensive set of instances from a whitelisted set of a user. Note that this may be performed even when sufficient instances of the primary instance type are available. In other words, despite available primary instances, less expensive selections may be provisioned to save user cost. A provisioned set may be completely comprised of instances of the primary type, or may have none at all of the primary instance type. This optimization may result in substantial cost savings for the user.

In cases where it is available a cloud provider's API may be used for accomplishing the same result. For example, AWS offers a "Fleet-Spot" API that may be used for this purpose.

In addition to the above schemes—systems and methods in accordance with some embodiments of the present invention may provision instances based on an equal-weighted allocation by instance weight. In this strategy, a machine may be provisioned across various instance types in the whitelist in a round-robin manner (or other rotating manner) so as to have roughly equal contribution to the normalized instance count from each instance-type. An advantage of such an allocation strategy, particularly in the case of dynamic priced instances, may be that the risk from losing instances due to price fluctuation is lowered. Price fluctuations may cause loss of one of the instance types in the list—but other instance types are likely to survive or not be negatively impacted by price fluctuations.

Continuing with the example set forth above, under this strategy seven (7) m3.2xlarge, ten (10) c3.xlarge, and twenty (20) c3.large instances for a combined total of 37 instances were allocated. Each instance contributes the same amount (7) to the normalized instance count (which is 21 in total).

In accordance with systems and methods of the present invention, there may also be the option to maintain a specific cluster composition. In other words, a user may be offered an option to compose clusters that are a mix of fixed-price (such as stable or on-demand instances) and dynamic-price (volatile or spot) instances. Users may specify the target percentage of instance types drawn from these different purchase options. In the case of heterogeneous clusters—a normalized instance count for each type of instance may be calculated, and may be maintained using normalized counts.

Similarly—at different places in auto-scaling module—the number of instances in a cluster may need to be determined. Alternatively, it may desirable to determine if a cluster should be scaled up or down. Such methods may use normalized instance counts. This may include: (i) Nodes may report their instance type as part of cluster management communication protocols; (ii) Centralized resource managers can take the instance type and the weights available via the heterogeneous configuration to compute normalized instance counts; and/or (iii) In some cases—mappings between IP addresses or instance identifiers and their types may be maintained, for example to speed up a calculation of normalized counts.

Running Applications on Heterogeneous Clusters. The work units (or tasks) in a cluster may typically use a portion of the resources (memory and CPU) in a worker node. In Map-Reduce, Tez and Spark, for example, each task runs in a container, which may be a unit of execution with some maximum amount of memory and CPU allotted to it. If the memory consumed by this unit exceeds the configured maximum, the process may be terminated. For example, a cluster management technology such as Hadoop YARN (Yet Another Resource Negotiator) may terminate the process. This may ensure that runaway jobs do not negatively impact other jobs, and that each job receives an appropriate or desirable share of worker node resources.

Traditionally tasks of an application use containers of a fixed and/or static size. In accordance with systems and methods of the present invention, clusters task container requirements (unless overridden by the application/user) may be optimized to the (single) instance type comprising the cluster's workers. For example, given an instance type with 20 GB memory and four (4) processors, applications may be configured to request containers of 4 GB memory and one (1) processor each. This arrangement may present optimal or desirable use of both memory and CPU resources. On the other hand, the same application targeted to a cluster with instances with eight (8) cores and twenty (20) GB memory may be configured to request containers of three (3) GB and one (1) CPU each. In heterogeneous cluster, two problems may arise with respect to resource sharing.

First, smaller instances may not run tasks that larger instance counterparts in the same family may run. For example, an m4.2xlarge may run 8 GB containers, while an m4.large may not be able to.

Second, tasks often benefit from a specific combination of memory and CPU resources; tasks may ran less optimally on other combinations. For example on big-data workloads—a task may run much slower (or may fail) when configured below a certain memory size. Typical reasons for this include the need to hold data-structures like hash-tables and sort buffers in memory as part of the task computation.

Accordingly, running tasks optimally on heterogeneous clusters may include at least two requirements: First, when a task is running on a specific machine, it may use a container size that may be accommodated within that machine. Otherwise the task may not be able to use that machine or the task may fail. Second, when a task is running on a specific machine, it may try to use a container size that may provide the best or desirable performance given the resources of the machine. For example a sort-intensive task may benefit from using 4 GB containers on m4 instance types, but may want to step down to 3 GB containers on C3 instance types, which will allow it to run—albeit slower.

In accordance with some embodiments of the present invention, at least two configuration strategies may be used: (i) a static configuration strategy; and (ii) a dynamic configuration strategy.

In a static configuration strategy, each application may use a static task configuration, but may also use a configuration corresponding to the least of all the instances that the heterogeneous cluster is configured to use. For example, a cluster may be treated as being homogeneously composed of the smallest of all the instances used in the cluster.

When using instances from different families (e.g. a c4 and an r3) it may not be obvious which is the "lesser" instance. For example, the c4 is CPU-dominant while the r3 is memory-dominant; each are advantageous in their own way. However, in general, jobs tend to be more memory-intensive than CPU intensive. This may be particularly true in both Hadoop and Spark. Accordingly, using default settings of a CPU-dominant instance type may serve well for a cluster comprising both types of instances. Between families, systems and methods of the present invention may use the following heuristic to determine the lesser instance, in descending order, in the AWS cloud:

| a. | i2, d2, r3 |
|---|---|
| b. | m2 |
| c. | m4 |
| d. | m3, m1 |
| e. | c4, c3 |
| f. | c1 |

Within a given instance family the smallest instance type may be used as the least instance. Referring again back to Example 1 it can be seen that c3.large is the smallest of the instances based on the table and rules above, and hence applications are configured as per a c3.large cluster.

In a dynamic configuration strategy each application may describes a range or enumeration of container sizes that it can use, for example from the least to the most preferred, and the task scheduler may allocate containers of different sixes. The scheduler may allocate containers of a size that most closely matches the configuration of the machine that the application is being scheduled on.

As an example, using Example 1 as the cluster configuration: Application A may request containers of one (1) CPU with flexible memory from 3 GB (least preferred) to 4 GB (most preferred). The Scheduler, when scheduling A on a machine of type m3.2xlarge, may allocate a container of 4 GB/1 CPU (because that uses memory/CPU on m3.2xlarge optimally). The Scheduler when scheduling B on a machine of c3.xlarge type, may allocate a container of 3 GB/1 CPU (since that's the largest that can be accommodated on that machine).

In this manner, and through the use of some embodiments of the present invention, heterogeneous clusters may offer a compelling solution to the interesting problems of price and availability of specific instance types in the cloud. The ability to choose different instance types, and still have the cluster perform optimally, may be highly relevant to being able to run a cluster at a desired capacity and optimal price.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A method of provisioning and using heterogeneous clusters in a cloud-based big data system, the heterogeneous clusters comprised of primary instance types and different types of instances, the method comprising:
   determining if there are composition requirements of any heterogeneous cluster, the composition requirements defining instance types permitted for use;
   determining if any of the permitted different types of instances are required or advantageous for use;
   determining an amount of different types of instances to utilize, this determination based at least in part on an instance weight;
   provisioning the heterogeneous cluster comprising both primary instances and permitted different types of instances.

2. The method of claim 1, wherein different types of instances are required when there are not enough primary instances available to perform a specific task.

3. The method of claim 1, wherein different types of instances are advantageous when different types of instances have reduced costs.

4. The method of claim 3, wherein different types of instances comprise spot instances.

5. The method of claim 1, wherein determining instance comprises:
   identifying the number of computer processing units (CPUs) in each other approved instance type;
   identifying the number of CPUs in the primary instance type;
   calculating a ratio for each other approved instance type between the number of CPUs in each other approved instance type and the number of CPUs in the primary instance type;
   deriving an instance weight for each other instance type based on the ratio determined for each other instance type.

6. The method of claim 1, further comprising running workloads across various instance types.

* * * * *